United States Patent [19]

Leyrer et al.

[11] Patent Number: 4,640,960
[45] Date of Patent: Feb. 3, 1987

[54] DEGRADATION OF POLY(DIACETYLENES)

[75] Inventors: Reinhold J. Leyrer, Ludwigshafen; Gerhard Wegner, Denzlingen; Michael Mueller, Waldkirch, all of Fed. Rep. of Germany

[73] Assignee: BASF Aktiengesellschaft, Fed. Rep. of Germany

[21] Appl. No.: 675,430

[22] Filed: Nov. 27, 1984

[30] Foreign Application Priority Data

Dec. 23, 1984 [DE] Fed. Rep. of Germany ....... 3346718

[51] Int. Cl.$^4$ ............................................. C08C 19/04
[52] U.S. Cl. .................................. 525/388; 525/328.1
[58] Field of Search ..................... 523/125; 204/159.2; 430/326, 270; 525/388, 328.1

[56] References Cited

U.S. PATENT DOCUMENTS 3,594,175  7/1971  Hay ..................................... 430/270
3,822,134  7/1974  Rasch .................................. 430/539
4,262,073  4/1981  Pampalone et al. ................. 430/326

OTHER PUBLICATIONS

Makromol. Chem., Rapid Commun. 3, 231–237, (1982), Wenz et al.
Makromol. Chem., Rapid Commun. 3, 249–254 (1982).
Journal of Polymer: Polymer Letters Edition, vol. 16, 607–614 (1978).
Journal of Chem. Phys. 70, 4387–4392 (1979).
Journal of Polymer Science: Polymer Letters Edition, vol. 17, 203–208.

Primary Examiner—Joseph L. Schofer
Assistant Examiner—N. Sarofim
Attorney, Agent, or Firm—Keil & Weinkauf

[57] ABSTRACT

Molecular degradation of poly(diacetylenes), in particular with production of poly(diacetylenes) having selected molecular weights, is carried out by a process in which the poly(diacetylenes), for example in solution or as solid or liquid layers, are present as a homogeneous mixture with sensitizers or sensitizer systems which can be activated chemically, those which can be activated by heat and/or those which can be activated by actinic light, and degradation of the poly(diacetylenes) is induced, in particular via free radical reactions, by appropriate activation of these sensitizers or sensitizer systems.

17 Claims, No Drawings

DEGRADATION OF POLY(DIACETYLENES)

The present invention relates to a process for the degradation of poly(diacetylenes) in solution or in the solid state, in particular with a marked reduction in the molecular weight of the poly(diacetylenes).

Poly(diacetylenes) are usually prepared by radiation-initiated topochemical polymerization of monomeric diacetylenes, for example by means of γ-radiation. The molecular weight of the resulting poly(diacetylenes) is essentially determined by the type of monomeric diacetylene and can be influenced by the polymerization conditions only to a limited extent. Increasing the radiation intensity or the exposure time increases the molecular weight of the polymer only within predetermined limits, but essentially leads to an increase in the monomer conversion, i.e. the yield of poly(diacetylene). Since the properties of the poly(diacetylenes) depend not only on the type of diacetylene building blocks but also on the molecular weight of the polymers, it is desirable, for a given chemical structure and a given chemical composition, to prepare poly(diacetylenes) having different molecular weights.

The literature discloses that exposure of poly(diacetylene) solutions to ultraviolet light results in a drop in the viscosity of the solution, this drop being attributable to a decrease in the molecular weight of the poly(diacetylenes) as a result of molecular degradation (cf. for example G. Wenz and G. Wegner, Makromol. Chem. Rapid Communications 3, (1982), 231). However, this method is not very suitable for selectively producing poly(diacetylenes) with particular molecular weights. Frequently, very long exposure times are required. Moreover, ultraviolet light having a wavelength of about 250–320 nm has to be employed, which requires special protective and safety measures.

It is an object of the present invention to provide a process which permits poly(diacetylenes) having the same structure but different, desired molecular weights to be prepared simply, rapidly and in a reproducible manner.

We have found that this object is achieved, in accordance with the invention, if poly(diacetylenes) are degraded in the presence of sensitizers which can be activated chemically, sensitizers which can be activated by heat and/or sensitizers which can be activated by actinic light.

The present invention accordingly relates to a process for the molecular degradation of poly(diacetylenes), in particular with marked reduction in the molecular weight of the poly(diacetylenes), wherein the poly(diacetylenes) are degraded in the presence of sensitizers or sensitizer systems which can be activated chemically, those which can be activated by heat and/or those which can be activated by actinic light, with appropriate activation of these sensitizers or sensitizer systems.

The present invention furthermore relates to special embodiments of this process as described in detail below.

Because of the large number of possible variations, the novel process can readily be adapted to the particular external conditions in question, and is consequently very widely applicable. It permits poly(diacetylenes) having any desired molecular weights to be prepared selectively in a comparatively short time and in a simple and reproducible manner. Surprisingly, we have found that the degradation of poly(diacetylenes) can be effected not only by exposure to ultraviolet light in the wavelength range corresponding to the characteristic absorption of the poly(diacetylenes), but, preferably and more advantageously, by using actinic light of any wavelength, and even just by heating the poly(diacetylenes) or by a purely chemical initiation at room temperature. After their activation, the sensitizers or sensitizer systems employed according to the invention induce or accelerate the molecular degradation of the poly(diacetylenes).

In principle, any conventional poly(diacetylenes) can be employed in the process according to the invention. Such poly(diacetylenes) are known per se and are described in the literature. One of the reasons why the use of soluble poly(diacetylenes) has proven advantageous is that the sensitizers can be mixed in simply and thoroughly using a solution of the substances. If insoluble poly(diacetylenes) are used, the sensitizers are advantageously incorporated into the polymers at as early a stage as the preparation of the poly(diacetylenes), i.e. during the polymerization; this can be done by, for example, co-crystallization of the appropriate sensitizers with the monomeric diacetylenes. The poly(diacetylenes) used in the novel process generally have a weight average molecular weight (determined by light scattering) of from 10,000 to 2,000,000, in particular from 50,000 to 1,000,000. Using the process according to the invention, the molecular weight of the poly(diacetylenes) can be selectively reduced and set within any limits.

Poly(diacetylenes) which are particularly useful according to the invention are those which are prepared by polymerization of monomeric diacetylenes of the general formula (I)

$$R^1—C≡C—C≡C—R^2 \quad \text{(I)}$$

and accordingly contain repeating structural units of the general formula (II)

$$\{C(R^1)—C≡C—C(R^2)\} \quad \text{(II)}$$

In the formulae (I) and (II), $R^1$ and $R^2$ can be identical or different and independently of one another are each an organic radical of in general 1 to 50 carbon atoms, in particular an aliphatic, aromatic or mixed aliphatic-aromatic radical of in general 1 to 50 carbon atoms, and these radicals can be saturated or unsaturated and unsubstituted or substituted and/or contain in particular heteroatoms and/or can be interrupted by heteroatoms or groups containing heteroatoms. Preferred heteroatoms in this context are oxygen, nitrogen and/or sulfur. $R^1$ and $R^2$ are preferably of 10 or more carbon atoms. Particularly preferred radicals $R^1$ and $R^2$ are those which contain ester, amide, sulfonate, urethane and/or urea groups. In the conventional diacetylenes, $R^1$ and $R^2$ are in general identical.

In the case of the soluble poly(diacetylenes), typical examples of the radicals $R^1$ and $R^2$ in the general formulae (I) and (II) are:

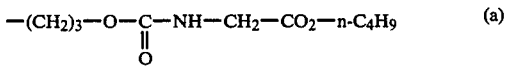

$$—(CH_2)_3—O—\underset{\underset{O}{\|}}{C}—NH—CH_2—CO_2—n\text{-}C_4H_9 \quad \text{(a)}$$

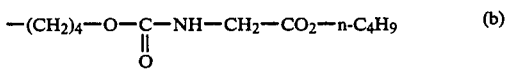

$$—(CH_2)_4—O—\underset{\underset{O}{\|}}{C}—NH—CH_2—CO_2—n\text{-}C_4H_9 \quad \text{(b)}$$

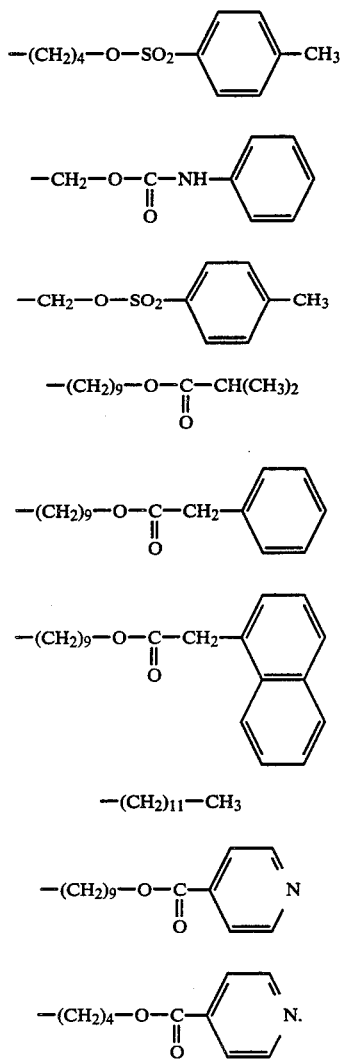

The corresponding poly(diacetylenes) and their preparation are described in, for example, J. Pol. Sci. Polymer Letters Ed. 16 (1978), 607; J. Chem. Phys. 70 (1979), 4387; J. Pol. Sci. Polymer Letters Ed. 17 (1979), 203 and Makromol. Chem. Rapid Comm. 3 (1982), 231, 249 and 815. Suitable solvents for the soluble poly(diacetylenes) include methylene chloride, chloroform, dimethylformamide, nitrobenzene, decalin and the like. It has proven particularly advantageous to use, in accordance with the invention, poly(diacetylenes) from which the unpolymerized monomeric diacetylenes, generally still present in the polymers after the polymerization, have been removed, for example by reprecipitation of the polymer or extraction with a suitable solvent, e.g. acetone.

The poly(diacetylenes) used according to the invention can be homopolymers of monomeric diacetylenes or copolymers of two or more different monomeric diacetylenes or of one or more monomeric diacetylenes with a minor amount of other conventional comonomers.

Preferred poly(diacetylenes) are those which consist exclusively of diacetylene units. In the novel process for the degradation of the poly(diacetylenes) the latter can be employed individually or as a mixture with one another.

Sensitizers which can be used together with the poly(diacetylenes) in the novel process are compounds or systems which can be activated by actinic light, by heat or chemically, and which, after their activation, induce or accelerate the molecular degradation of the poly(diacetylenes).

The photoactivable sensitizers include compounds which form reactive free radicals directly under the action of actinic light, in particular light having a wavelength of about 180–800 nm. These free radicals then react with the poly(diacetylenes) with molecular degradation. An example of such a compound is azobisisobutyronitrile. Other suitable photoactivable sensitizers are compounds which have one or more absorption bands in the wavelength range of actinic light, in particular in the range from about 180 to 800 nm, and which, when exposed to actinic light, undergo a transition to an excited high-energy state, very often, for example, the triplet state, and, on undergoing a transition out of this excited state, induce or accelerate the degradation of the poly(diacetylenes) by energy transfer or, in particular, via free radical reactions. The photoactivable sensitizers of this category include, for example, xanthene dyes, of which Rhodamine 6 G has proven one of the particularly advantageous ones, thiazinium dyes, e.g. methylene blue, polynuclear quinones and their derivatives, in particular anthraquinone or anthraquinone derivatives, and aryl ketones, in particular benzophenone, Michler's ketone or mixtures of benzophenone and Michler's ketone.

The heat-activable sensitizers, which can be activated by direct or indirect heating or by heat radiation, for example infrared radiation having a wavelength longer than 0.8 μm, are in general compounds which form reactive free radicals at elevated temperatures, and then effect molecular degradation of the poly(diacetylenes) via a free radical reaction with the latter. Hence, the heat-activable sensitizers are, as a rule, compounds which are of a free radical nature or decompose to form free radicals under the action of heat, and which react with the poly(diacetylenes) at elevated temperatures. Preferred heat-activable sensitizers are compounds which form reactive free radicals under the action of heat, in particular at about 40°–200° C. These include, in particular, compounds as are conventionally used as free radical catalysts for the polymerization of ethylenically unsaturated compounds. Typical examples of these are azobisisobutyronitrile and benzoyl peroxide.

Examples of sensitizers and sensitizer system which can be activated chemically are, in particular, the compounds which form reactive free radicals in the presence of other compounds, in particular reducing agents. These include, in particular, the redox systems which are conventionally used as polymerization catalysts and which react with formation of free radicals. Examples of these are hydrogen peroxide/$Fe^{2+}$, benzoyl peroxide/$Fe^{2+}$, peroxide/amine and C—H-labile organic compound/uranyl acetate.

The sensitizers which can be activated and which are used according to the invention for the degradation of the poly(diacetylenes) also include oxygen. The activation of the latter in the poly(diacetylene)/$O_2$ system is effected by exposure to actinic light, in particular to light having a wavelength of about 250–320 nm. Without wishing to be bound by this theory, it is assumed that the actinic radiation first converts the poly(diacetylene) to an excited state; on undergoing a transition out of this excited state, the poly(diacetylene) then interacts with the oxygen, insertion and formation of peroxide bonds taking place in the final stages, and these peroxide bonds effect and accelerate the degradation of the poly(diacetylenes) via free radical reactions.

The sensitizers can be used alone or as a mixture with one another. In one embodiment of the invention, it is possible to use, for example, photoactivable sensitizers whose absorption maxima are in the range of the characteristic absorption of the poly(diacetylenes). In this case, the presence of the sensitizers not only accelerates the degradation of the poly(diacetylenes) but in some cases also permits higher degrees of degradation to be achieved. In another embodiment, it is possible to employ photoactivable sensitizers whose absorption maxima are outside the range of the characteristic absorption of the poly(diacetylenes); this makes it possible to use radiation sources which are simple to handle, for example sources of visible light. It is also possible to use mixtures of photoactivable sensitizers whose absorption maxima are in different wavelength ranges. This permits the actinic light emitted by the radiation source to be better and more completely utilized, and to be rendered efficient with respect to the degradation of the poly(diacetylenes). Where heat-activable sensitizers are employed, the use of actinic light can be completely dispensed with, and simple, direct or indirect heating of the poly(diacetylene)/sensitizer mixture is sufficient for achieving degradation of the poly(diacetylenes). It is of course also possible to use a combination of photoactivable and heat-activable sensitizers. The sensitizers or sensitizer systems are used in general in amounts of from 0.001 to 10, preferably from 0.05 to 5%, by weight, based on the poly(diacetylene).

For the process according to the invention, the poly(diacetylenes) can be used as an intimate mixture, or in intimate contact, with the sensitizers, in any desired form. It has proven very advantageous to subject a solution of the poly(diacetylenes) and the sensitizers or sensitizer systems to the treatment for activating the sensitizers and hence for effecting degradation of the poly(diacetylenes). Suitable solvents are the above solvents for poly(diacetylenes). The concentration of the poly(diacetylenes) in these solutions can vary within wide limits, and is in general from 0.01 to 50% by weight, based on the total solution. The solutions are advantageously kept thoroughly mixed during the activation treatment and the degradation reaction. The solutions, particularly when highly concentrated, can also be used in the form of thin liquid layers.

It is also possible to subject solid mixtures of the poly(diacetylenes) and sensitizers to the treatment for degrading the poly(diacetylenes). Advantageously, thin solid layers of the poly(diacetylenes) in which the sensitizers are homogeneously dispersed are employed for this purpose. These solid layers can be produced either directly by polymerization of the monomeric diacetylenes in a thin layer, or by a conventional technique, for example by casting from solution, evaporating the solvent and drying. The thickness of the layers can be varied within wide limits, thicknesses of from 10 nm to about 100 $\mu$m having proven useful in practice. Multistratum poly(diacetylene) layers may also be used.

Particularly when they are used in the form of solid layers, the poly(diacetylenes) can also be mixed with other additives, e.g. plasticizers, pigments, fillers, antioxidants, etc. in addition to the sensitizers. These additives, which are generally present in amounts of not more than 40, in particular not more than 30,% by weight, based on the poly(diacetylene), are used in particular for modifying or improving the properties of the layer for subsequent use.

Depending on the type of sensitizer or sensitizers employed, energy in the form of heat energy and/or radiation energy is supplied to the mixture of poly(diacetylenes) and sensitizers, for the degradation of the poly(diacetylenes); in the case of sensitizers which can be activated chemically, a component of the redox system is, if necessary, added to the mixture.

Where heat-activable sensitizers are used, the heat is supplied uniformly to the mixture being treated, by any desired method. If poly(diacetylene) solutions are used, direct or indirect heating by any conventional method can be employed. If the poly(diacetylenes) are present in the form of solid layers, the heat required for inducing the degradation can be supplied, for example, by passing a current of warm air over the layer or, advantageously, by exposure to heat radiation, for example infrared radiation having a wavelength longer than about 0.8 $\mu$m. For the heat-sensitized degradation of the poly(diacetylenes), the solutions or layers of these compounds are generally heated at from 40° to about 200° C., preferably from about 45° to about 150° C.

If photoactivable sensitizers are used for inducing or accelerating the degradation of the poly(diacetylenes) the poly(diacetylene)/sensitizer mixture is exposed to actinic light, in particular light having a wavelength of from about 180 nm to about 800 nm, in order to carry out the process according to the invention. The wavelength of the actinic light is preferably matched with the absorption maxima of the sensitizers. Suitable radiation sources are those conventionally used for actinic light in the ultraviolet and visible wavelength ranges, e.g. incandescent lamps, halogen lamps, low pressure, medium pressure or high pressure mercury lamps, which may, if appropriate, be doped with, for example, iron or gallium, xenon lamps, fluorescent tubes, superactinic fluorescent tubes, excimer lasers, UV lasers, etc. It has proven particularly advantageous here to effect exposure with actinic light having a wavelength of about 350-800 nm, using sensitizers which absorb in this wavelength range.

The duration of heating and/or irradiation of the poly(diacetylene)/ sensitizer mixtures depends not only on the type of sensitizer employed, the energy source used and other process parameters, e.g. layer thickness, concentration of the solution, etc. but, in particular, also on the extent to which it is desired to decrease the molecular weight. According to the invention, it is usually possible to achieve substantial degradation of the poly(diacetylenes) in only a few minutes. The desired molecular weights can be obtained readily and in a reproducible manner.

The systems which can be activated chemically, in particular the redox systems, and oxygen are particularly useful as sensitizers when the process according to the invention is carried out in solution. Where oxygen is employed, it is most advantageously passed through the solution of the poly(diacetylenes), which becomes saturated with $O_2$, and the solution is exposed to actinic light, in particular light having a wavelength of about 250-320 nm, until the desired decrease in molecular weight is achieved. In the case of the redox systems, the following procedure can be used: a solution of the poly(diacetylene) and, if desired, one component of the redox system is initially taken, and the other component, preferably the reducing agent, is then introduced into this solution with simultaneous thorough mixing, or both components of the redox system are introduced into the solution of the poly(diacetylene), mixing being carried out in the stated manner. If the redox system becomes active only at elevated temperatures or when exposed to actinic light, it is also possible to add both components of the redox system to the poly(diacetylene), and to initiate the degradation by appropriately supplying heat or light. When the sensitizers used are redox systems, the extent of reduction of the molecular weight can be controlled via the amount of sensitizer.

After degradation, the poly(diacetylenes) can be used as such, and immediately, for the intended purpose. If poly(diacetylene) solutions are used in the novel process, the poly(diacetylenes) can first be isolated from this solution before being used further, isolation being effected by, for example, evaporating off the solvent or precipitating with a non-solvent, or they can be further processed directly from the solution. After degradation of the poly(diacetylenes), solid layers of these compounds can generally be used directly. However, they too can, if desired, be extracted, dissolved or converted in another manner, before being processed further.

Using the process according to the invention, the molecular weights of poly(diacetylenes) can be varied and reduced in a simple manner, and can be brought selectively and reproducibly to the particular range desired. Hence, it is also possible to modify the properties of the poly(diacetylenes) and to adapt their properties to the requirements set. The degraded poly(diacetylenes) as obtained by the process according to the invention are particularly useful for the production of positive-working photodegradable resist layers and dry film resists. By adjusting the molecular weight to a selected value, it is possible to produce, in particular, radiation-sensitive poly(diacetylene)-based resist layers which possess defined mechanical, e.g. elastic, properties and variable sensitivity.

The Examples which follow illustrate the invention. Parts and percentages are by weight, unless stated otherwise. The relative or reduced viscosity of the poly(diacetylenes) has been determined as a measure of the molecular weight.

EXAMPLE 1

Deca-4,6-diyne-1,10-diol-bis-(n-butoxycarbonyl-methylurethane) was polymerized by exposure to $^{60}$Co γ-radiation (3 megarad). The crystalline poly(diacetylene), which was obtained in a yield of 30%, was of the general formula (II) where $R^1$ and $R^2$ are identical and are each the radical stated under (a) in the description. The unreacted monomer was removed from the resulting polymer (P3BCMU) by extraction with acetone. The resulting fiber, which possessed a metallic gloss, were dissolved in chloroform in a concentration of 1.1 g of P3BCMU per liter of chloroform, and oxygen was passed through this solution in finely dispersed form. The oxygen-saturated solution was exposed for 2.5 minutes to an HBO-200 W very high pressure mercury lamp. During this procedure, the relative viscosity decreased from an initial value of 1.90 to 1.74.

EXAMPLE 2

The procedure described in Example 1 was followed, except that, in this case, instead of passing oxygen through the solution of P3BCMU in chloroform, azobisisobutyronitrile was added in a concentration of $1.8 \cdot 10^{-3}$ mole per liter of chloroform. The solution was exposed for 2.5 minutes to the very high pressure mercury lamp as described in Example 1. As a result, the relative viscosity decreased from 1.90 to 1.53.

COMPARATIVE EXPERIMENT A

The procedure described in Example 1 was followed, except that in this case the solution of P3BCMU in chloroform was exposed directly to the very high pressure mercury lamp described in Example 1 for 2.5 minutes, i.e. without oxygen being passed through or any other sensitizer being added. During this procedure the relative viscosity decreased from 1.90 to only 1.83.

EXAMPLE 3

The procedure described in Example 1 was followed, except that in this case benzophenone was added to the solution of P3BCMU in chloroform, in a concentration of $1.4 \cdot 10^{-3}$ mole per liter of chloroform. Oxygen was not passed through the solution. After exposure for 2.5 minutes to the very high pressure mercury lamp described in Example 1, the relative viscosity had decreased from 1.90 to 1.30.

EXAMPLE 4

The procedure described in Example 3 was followed, except that in this case, instead of benzophenone, anthraquinone was added to the solution of P3BCMU, in a concentration of $1.1 \cdot 10^{-3}$ mole per liter of chloroform. After exposure, a relative viscosity of 1.10 was measured.

EXAMPLE 5

1.3 g of the poly(diacetylene) of Example 1 (P3BCMU) were dissolved in 1 liter of chloroform, and $1.6 \cdot 10^{-2}$ mole of azobisisobutyronitrile was added to this solution. The solution was heated to 45° C. for 20 minutes. During this procedure, the reduced viscosity ($\eta_{sp}/c$) decreased from 1.09 to 0.58 l/g.

EXAMPLE 6

The procedure described in Example 5 was followed, except that in this case the poly(diacetylene)-/azobisisobutyronitrile solution was heated to 55° C. for 20 minutes. During this procedure, the reduced viscosity decreased from 1.09 to 0.33 l/g.

COMPARATIVE EXPERIMENT B

The procedures described in Examples 5 and 6 were followed, except that in this case azobisisobutyronitrile was not added to the poly(diacetylene) solution. The reduced viscosity remained unchanged at 1.09 l/g, both after heating to 45° C. for 20 minutes and after heating to 55° C. for the same time.

EXAMPLE 7

In this case, 0.96 g of P3BCMU was dissolved in 1 liter of chloroform, and $2.0 \cdot 10^{-5}$ mole of Rhodamine 6 G was added to this solution. The solution was exposed to actinic light having a wavelength of 546 nm for 5 minutes, the relative viscosity decreasing from 2.15 to 1.26.

EXAMPLE 8

The procedure described in Example 7 was followed, except that in this case, instead of Rhodamine 6 G, $3.1.10^{-5}$ mole of the dye methylene blue was added to the poly(diacetylene) solution. This solution was exposed to actinic light having a wavelength of 579 nm for 5 minutes, the relative viscosity decreasing from 2.15 to 1.17.

COMPARATIVE EXPERIMENTS C AND D

Examples 7 and 8 were repeated, except that in this case Rhodamine 6 G and methylene blue were not added. The poly(diacetylene) solution was exposed, for 5 minutes in each case, to actinic light having a wavelength of 546 nm and 579 nm, respectively. In both cases, the relative viscosity remained unchanged, being 2.15 both before and after exposure.

EXAMPLE 9

An azobisisobutyronitrile-containing poly(diacetylene) solution in chloroform was prepared as described in Example 5, and this solution was divided into 4 parts. All four parts were heated to 45° C., the first part for 10 minutes, the second part for 20 minutes, the third part for 30 minutes and the fourth part for 40 minutes. The initial reduced viscosity of the solution, i.e. 1.09 l/g, decreased to 0.72 l/g in the first case, to 0.58 l/g in the second case, to 0.48 l/g in the third case and to 0.42 l/g in the fourth case. Using a spin-coating method, a film was applied from each of the four solutions onto a glass substrate coated with aluminum by vapor deposition. After evaporation of the solvent and drying, each of the dry films were about 10 nm thick. In this manner, radiation-sensitive resist layers having differentiated properties were obtained.

EXAMPLE 10

The procedure described in Example 1 was followed, except that in this case, instead of oxygen being passed through, $1.1.10^{-3}$ mole per liter of anthraquinone and $2.10^{-5}$ mole of Rhodamine 6 G were added to the poly(diacetylene) solution. Using a spin coating method, a 10 nm thick resist film was produced from this solution on a glass substrate coated with aluminum by vapor deposition. The resist layer was first exposed imagewise through a photomask to actinic light having a wavelength of 546 nm, and was then developed by washing out with acetone. The parts of the aluminum-coated glass substrate which had been bared imagewise during this procedure were etched so that the glass was bared. Those parts of the resist layer which still remained unexposed were exposed to ultraviolet light through a UV mask in a second imagewise exposure step and were then developed, likewise by washing out with acetone. After this second imagewise structuring, it was possible to treat the aluminum surface once again, independently of the first step.

We claim:

1. A process for reducing the molecular weight of poly(diacetylenes) of the formula $=C(R^1)-C\equiv C-C(R^2)=$ wherein $R^1$ and $R^2$ are organic compounds of 1 to 50 carbon atoms comprising preparing an homogeneous mixture of said poly(diacetylene) with a sensitizer which can be activated to form reactive free radicals when treated with chemicals, heat or actinic light, treating said mixture to said activating conditions thereby reducing the molecular weight of said poly(diacetylene).

2. A process as claimed in claim 1, wherein a solution of the poly(diacetylene) and sensitizer is employed.

3. A process as claimed in claim 1, wherein a thin solid or liquid layer based on the poly(diacetylene) and containing a homogeneously dispersed sensitizer is employed.

4. A process as claimed in claim 1, wherein the heat-activatable sensitizer used is a compound which forms reactive free radicals under the action of heat, and the homogeneous mixture of the poly(diacetylene) with this sensitizer is heated to 40°–200° C., but to no lower than the activation temperature of this sensitizer.

5. A process as claimed in claim 1, wherein the sensitizer used is a redox catalyst which reacts with formation of free radicals.

6. A process as claimed in claim 2, wherein the sensitizer used is oxygen.

7. A process as claimed in claim 1, wherein the sensitizer is used in an amount of from 0.001 to 10% by weight, based on the poly(diacetylene).

8. The process of claim 1, wherein the sensitizer used is a photosensitizer which can be activated by exposure to actinic light having a wavelength of about 180–800 nm and which, on exposure to actinic light, is capable of forming reactive free radicals or of energy transfer which induces and/or accelerates the degradation of the poly(diacetylenes).

9. The process of claim 8, wherein the sensitizer is an xanthene dye.

10. The process of claim 8, wherein the sensitizer is a thiazinium dye.

11. The process of claim 8, wherein the sensitizer is a polynuclear quinone or a polynuclear quinone derivative.

12. The process of claim 8, wherein the sensitizer is a aryl ketone.

13. The process of claim 4, wherein the heat activatable sensitizer is axobisisofutyronitrile.

14. The process of claim 4, wherein the heat activatable sensitizer is benzoyl peroxide.

15. The process of claim 6, wherein the degradation is induced by exposing the oxygen-containing mixture to actinic light having a wavelength of from about 250 to 320 nm.

16. The process of claim 1, wherein the poly(diacetylene) is soluble in methylene chloride.

17. The process of claim 1, wherein the poly(diacetylene) is one from which the residual unpolymerized monomeric diacetylenes have been removed prior to the degradation treatment.

* * * * *